C. J. BERTHEL.
VULCANIZING OVEN.
APPLICATION FILED AUG. 3, 1920.
1,382,948.
Patented June 28, 1921.
3 SHEETS—SHEET 1.
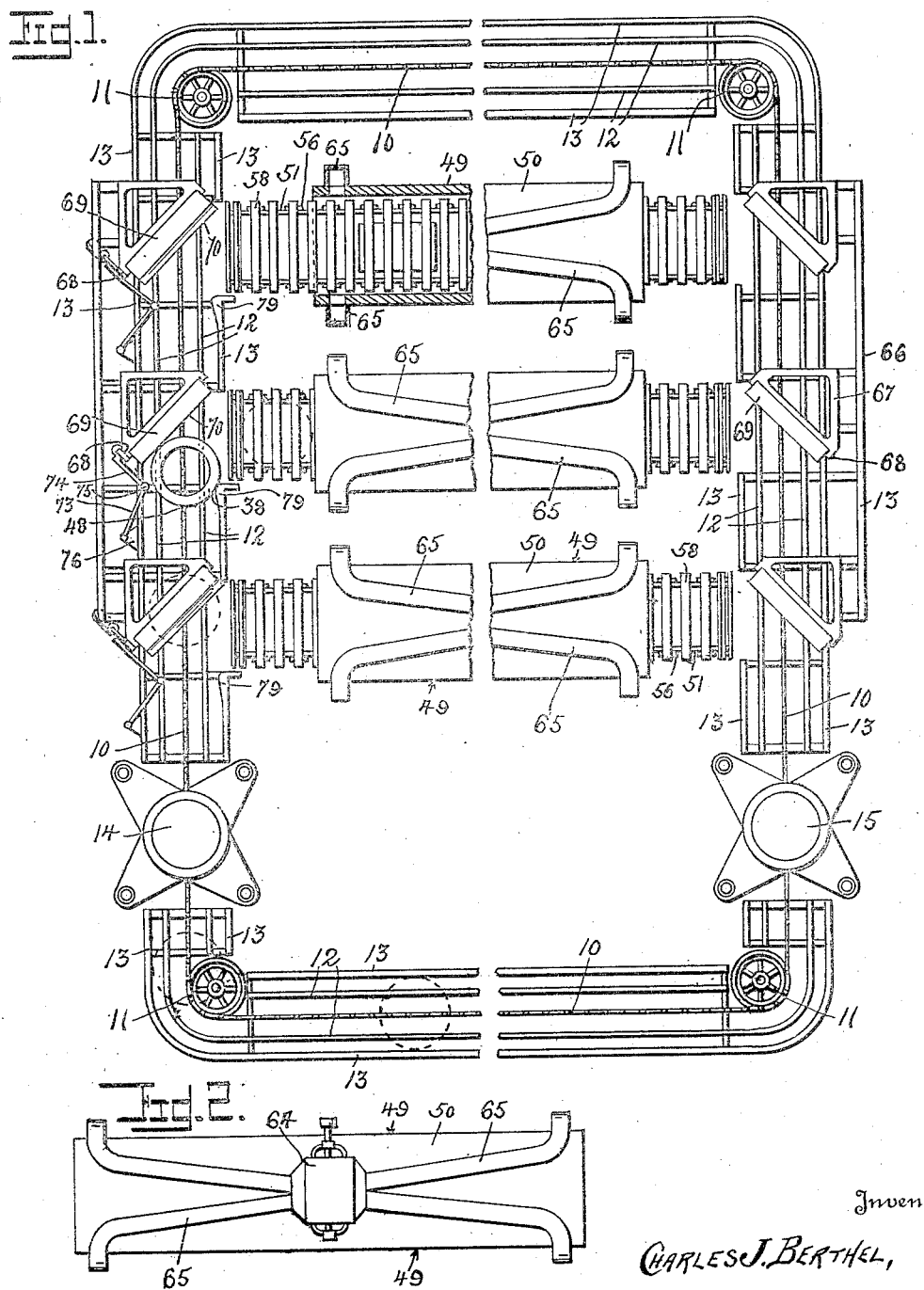
Inventor
CHARLES J. BERTHEL,
By Geo. P. Kimmel
Attorney

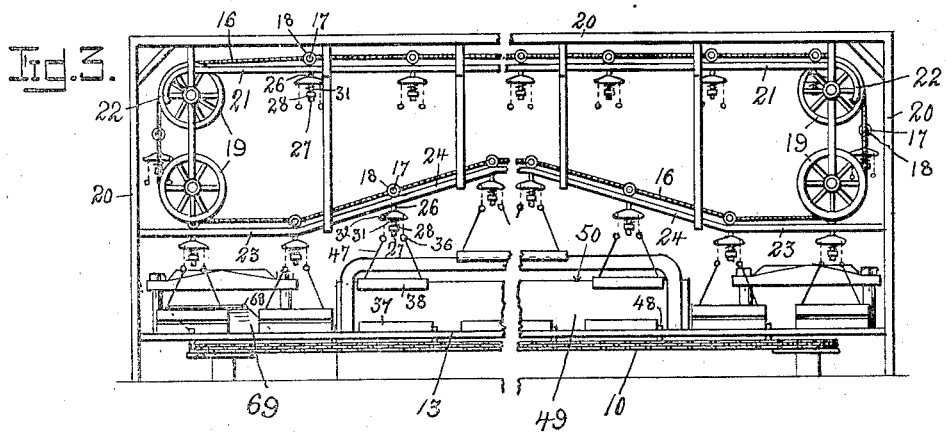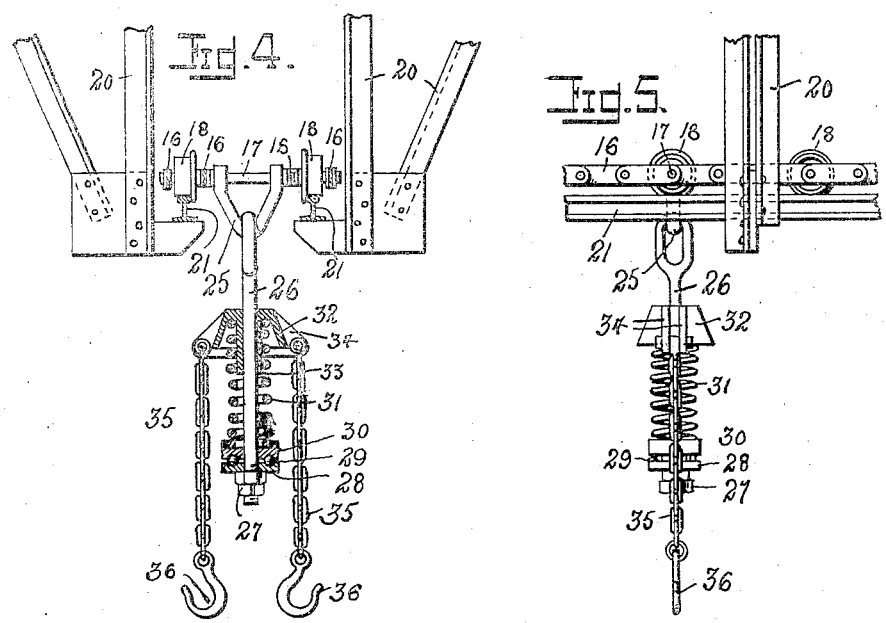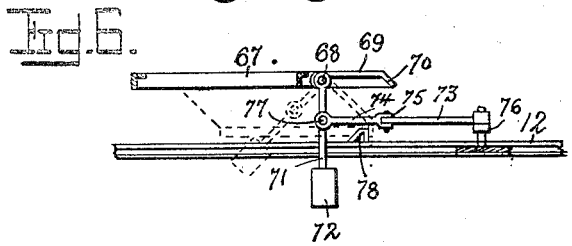

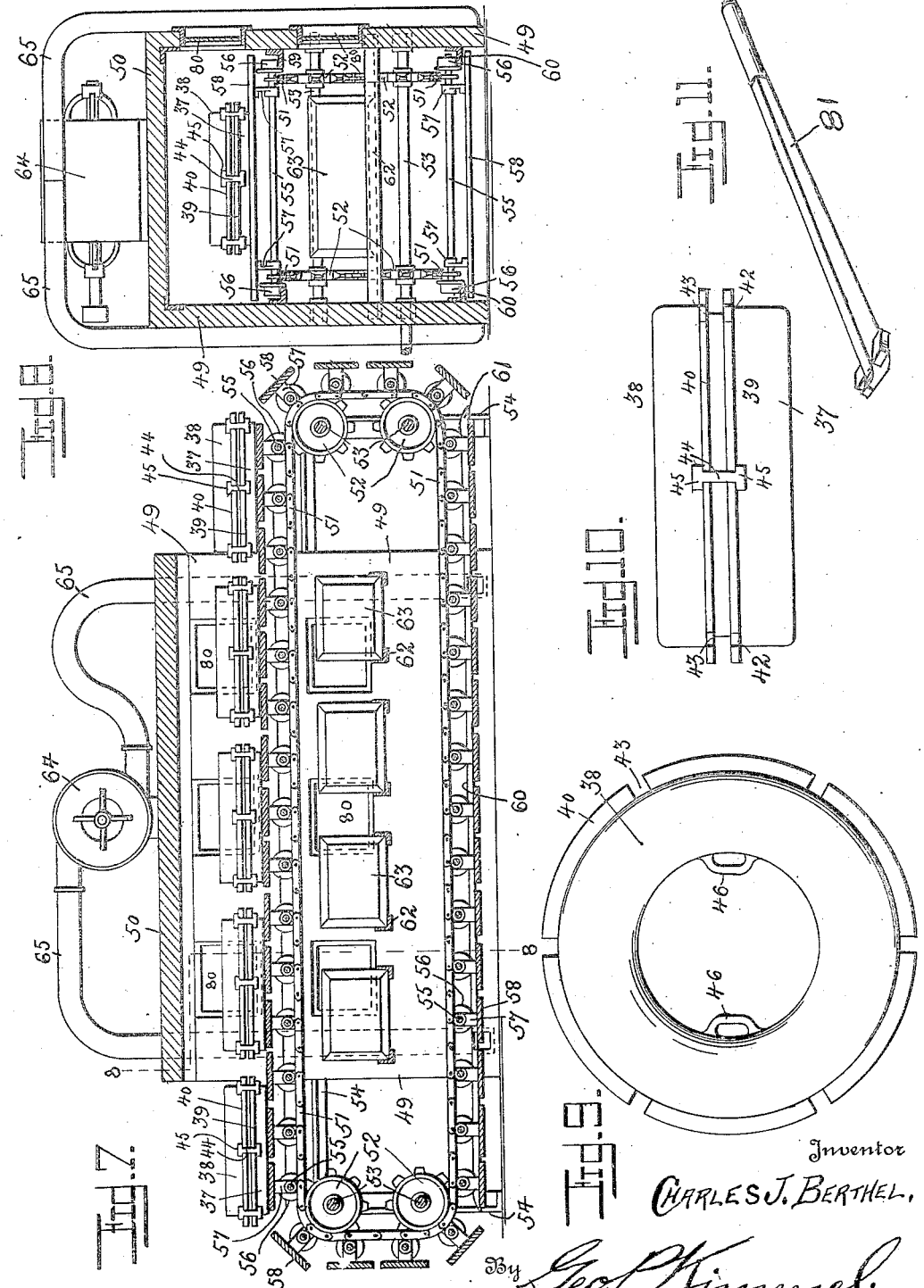

UNITED STATES PATENT OFFICE.

CHARLES J. BERTHEL, OF AKRON, OHIO.

VULCANIZING-OVEN.

1,382,948. Specification of Letters Patent. Patented June 28, 1921.

Application filed August 3, 1920. Serial No. 400,931.

*To all whom it may concern:*

Be it known that I, CHARLES J. BERTHEL, a citizen of the Republic of Germany, residing at Akron, in the county of Summit and State of Ohio, have invented certain new and useful Improvements in Vulcanizing-Ovens, of which the following is a specification.

This invention relates to an apparatus for the continuous treating or curing of articles of rubber and rubber compounds or combinations, more particularly the tires of the wheels of motor driven vehicles, and has for one of its objects to improve the construction and increase the efficiency and utility of devices of this character.

Another object of the invention is to provide an apparatus of this character in which provision is made for subjecting the articles in the molds continuously and uniformly to the action of heat, and the means whereby the molds are maintained in constant and uniform movement from the intake to the outlet end of the heating chamber.

Another object of the invention is to provide an apparatus of this character in which provision is made for utilizing endless traveling conveyers to conduct the molds containing the articles to be treated continuously through a heating chamber or "oven."

Another object of the invention is to provide an apparatus of this character embracing a continuous endless conveyer device with its sides in parallel relation, and a plurality of conveyer devices operating through heating chambers and between the sides of the endless conveyer, and with means whereby the molds containing the articles to be treated are shunted during their outward passage from one side of the endless conveying device to any selected lateral conveyer device and shunted from thence to the other side of the endless conveyer device.

With these and other objects in view, the invention consists in certain novel features of construction as hereinafter shown and described and then specifically pointed out in the claims, and in the drawings illustrative of the preferred embodiment of the invention, Figure 1 is a plan view of the improved apparatus, Fig. 2 is a plan view of one of the curing ovens.

Fig. 3 is an end elevation.

Fig. 4 is an enlarged detail, partly in section, of one of the mold cover handling devices, Fig. 5 is a side elevation of the parts shown in Fig. 4.

Fig. 6 is an enlarged detail of one of the tripping devices whereby the molds are shunted to the curing ovens.

Fig. 7 is an enlarged longitudinal section of one of the curing ovens.

Fig. 8 is a section on the line 8—8 of Fig. 7,

Fig. 9 is an enlarged plan view, and—

Fig. 10 is an enlarged side view, of one of the tire holding molds.

Fig. 11 is a detached perspective view of the "cracking bar" whereby the cover or top member of the mold is forced from the base portion, or "cracked."

The improved apparatus comprises in general an endless conveyer chain, represented as a whole at 10, and operating over carrier pulleys or chain wheels 11, the latter so located that the chain 10 is oblong in outline, or with the sides in parallel relation as illustrated in Fig. 1.

Suitably supported in parallel relation to the side portions and the end portions of the chain 10 are mold supporting rails 12, and likewise suitably supported in parallel relation to the chain 10 and rails 12 and spaced therefrom are mold guard and guide rails 13.

The rails 12 are shown formed of light railway rails while the guard rails 13 are shown formed of L bars, which are the preferable forms of these members, but it will be understood that it is not desired to be limited to any specific form of these parts.

Located in the lines of the rails 12 and 13, at suitable points, preferably in the side portions, are presses, preferably hydraulic presses, represented conventionally at 14 and 15. The supporting rails 10 and guard rails 13 are interrupted where the presses 14 and 15 are located, with the "floors" of the presses in alinement with the bearing faces of the supporting rails, so that the molds can be easily transferred from the rails to the presses or from the presses to the rails as the case may be.

Provision is made in the improved apparatus for handling the relatively heavy mold tops or members and this consists of endless chains 16 coupled at suitable intervals by shafts 17, the latter provided with flanged guide pulleys 18.

The chains 16 are double operate over chain pulleys 19 suitably supported in a framework 20, the pulleys being arranged to operate the chain in oblong outline, as shown in Fig. 3. Supported from the frame 20 in parallel relation to the upper side of the chain 16, are supporting rails 21 over which the flanged wheels 18 operate, and thus support the upper length of the chain.

At their ends the rails 21 are curved downwardly as shown at 22, to permit the wheels 18 to pass, as hereafter explained.

Supported from the frame 20 beneath the lines of the lower length of the chain 16 are other supporting rails 23, the latter being directed upwardly intermediate the ends as shown at 24. The wheels 18 engage the rail 23 in their passage between the down carrier pulleys 19 and are carried upwardly while passing over the upwardly directed portions 24, as shown in Fig. 3.

Suspended from each shaft 17, is a yoke 25, and swinging from each yoke is a rod 26 (see Figs. 4 and 5). At their lower ends each rod 26 is threaded to receive holding nuts 27, the latter supporting a plate 28 having a ball race in its upper face to support bearing balls 29. Slidable on the rod 26 is another holding plate 30 having a ball race in its lower face to bear on the balls 29, and with a sunken upper face to receive the lower end of a coiled spring 31 which surrounds the rod 26.

Slidable on the rod 26 is a cone shaped member 32 having an inner sleeve 33 around which the upper part of the spring 31 engages.

The member 32 is formed with spaced ears 34 between which the upper ends of chains 35 are swingingly supported, the lower ends of the chain having hooks 36.

The molds to receive and form the tires are represented more completely in Figs. 9 and 10, and each comprises a base or foundation 37 and an upper or cap portion 38, the confronting edges of the mold members having outstanding flanges 39 and 40 provided with vertically alining recesses or seats 42 and 43. Each alined pair of the seats is designed to receive a locking block, the latter each comprising an intermediate body portion 44 to enter the recesses and lateral terminal ribs 45 to bear upon the flanges adjacent to the recesses, as shown more clearly in Fig. 10.

The members 37 and 38 are annular and each member is provided with loops 46 to receive the lower hooked terminals of suspension rods 47, the upper ends of the latter being formed with eyes to engage the hooks 36 of the suspension chains 35.

The members 28 and 30 together with balls 29 and spring connection 35, provide an effectual yieldable thrust bearing which will assist the operator in turning the relatively heavy top members under full load into any desired position.

By coupling at two points only by the loops 46, the lid can be easily turned into convenient position for cleaning.

The mold lid lifting apparatus will coöperate with the mold moving conveyer to cause the mold top or cover to be removed and replaced perpendicularly.

The distance between the last heater and press 15 must be sufficient to give the tire in the mold time to cool to the required extent.

The endless chain 10 is provided at intervals with studs 48 which project into the paths of the mold bases 37, and "pick up" the latter and carry the molds around with the chain.

Disposed between the confronting guard rails 13 are a plurality of heating chambers or "ovens," each comprising side walls 49 and top 50, preferably of concrete or like non-conductive and heat resisting material.

Any required number of the "ovens" may be employed, but for the purpose of illustration, three are shown.

Arranged to operate through each of the ovens is an endless carrier belt, each belt comprising chains or cables 51 running over chain wheels 52 mounted on shafts 53 which are in turn supported by suitable frames 54 externally of the ovens and close to the guard rails 13.

The chains 51 are coupled at short intervals by shafts 55, and mounted on each shaft externally of the chain are flanged carrier wheels 56.

Connected to each shaft 55 are brackets 57 to which relatively wide slats or platforms 58 are attached.

Supported by the walls of the oven are upper rail members 59, preferably of L shaped bars, upon which the carrier wheels 56 which for the time being are at the upper side of the chain run, the upper rails thus supporting the chains and slats while running through the oven.

Supported by the walls of the oven are lower rails 60, similar to the upper rails 59, and serve to support the wheels 56 during the lower or return travel of the slatted belt. At their ends the rails 59 are curved, as shown at 61, to facilitate the passage of the wheels 56.

The slatted conveyer belts of the ovens thus operate at right angles to the side portions of the chain 10. The molds 37—38 are transferred from the rails 12 to the slats 58, and to enable this to be done the guard rails are cut away opposite the slatted belts as shown in Fig. 1.

Suitably supported within the ovens between the sides of the chains 51, for instance by transverse beams 62 embedded at their ends in the walls of the oven, are suitable heating devices, preferably electric heaters, indicated conventionally at 63.

Means are preferably employed to pass air currents through the ovens, and for the purpose of illustration a blast fan indicated at 64, is located adjacent to each oven and provided with air conductor elements 65 connecting the fan with the interior of the oven, to qualify and more evenly distribute the heated air.

A plurality of the ovens being employed and only one carrier chain 10 to conduct the molds to the ovens, means must be provided for transferring the molds to the ovens, and such means are illustrated in Figs. 1 and 6.

Supported by suitable frames 66 opposite each end of each of the ovens, is an angular bracket device 67, the edge of each bracket nearest to the slatted belt being oblique to the longitudinal axis of the belts and of the line of travel of the chain 10.

Mounted to swing at 68 vertically upon the diagonal or oblique edge of each of the brackets 67 at the forwardly or outwardly moving side of the chain 10 is a plate 69, the free edge of each plate being formed with a stop rib or flange 70. Depending from one of the pivots 68 of each of the plates 69 is a rod 71 carrying a balancing weight 72.

The weights operate to maintain the plates 69 normally in elevated position as shown in full lines in Fig. 6, to permit the molds which are moved forwardly by the chain 10, to pass beneath the plates, but if the rod be elevated, against the resistance of the weight, the plate 69 associated therewith will be depressed to move its flange 70 into the path of the mold upon the rails 12 and the latter thus shunted laterally to the nearest slatted belt and thence through the oven.

Means are provided whereby the forward movements of the molds will be utilized to automatically shunt them to the ovens, this means consisting of links 73 and 74 pivotally united at 75, with the link 73 pivoted to a stationary bracket 76 on the frame 13, and the link 74 pivoted at 77 to the weight carrying rod 71. The links 73 and 74 are so proportioned that the pivoted portions 75 extend into the paths of the molds as they are moved along the tracks 12, and forced laterally thereby and thus operate the rods 71 and depress the plate 69 against the resistance of the weight, to bring the stop flange 70 into the path of the mold and cause the latter to be shunted to the slatted belt of the curing oven, as before described.

Stops 78 are arranged to limit the downward movement of the plates 69, and offsets 79 are arranged in the inner guard rail adjacent each slatted belt, to insure the engagement of the mold with the links 74 and 75.

The plates 69 at the return side of the chain 10 and rails 12 are not provided with the weights and rods, as they merely operate as automatic stops and shunt devices to guide the molds after treatment in the ovens to the return side of chain 10 and rails 12.

As the molds pass to the press 15, the latter is utilized to successively compress the top members 38 to enable the lock devices 44—45 to be released, and as the released molds pass beneath the rail 23, the rods are coupled to the loops 46 and the top members 38 elevated when the wheels 18 ride up the inclined parts 24 of the tracks 23, to enable the "cured" tire to be removed and a "green" tire substituted therefor while the wheels 18 are traveling over the elevated portion of the tracks. As the movement proceeds, the wheels 18 traveling again to the lower part of the track 23, cause the top members 38 to be restored to the bed portions 37 which has been supplied with the "green" tire, and the molds thus charged conducted to the press 14 where the locking devices are applied, as before described.

The operation is thus practically continuous, and the several ovens supplied with a practically continuous "flow" of the charged molds.

A plurality of observation windows 80 are located in one of the walls of the chamber or oven, through which the action of the molds and of the heating elements may be noted.

The preferred embodiment of the invention is disclosed in the drawings and set forth in the specification, but it will be understood that any modifications within the scope of the claims may be made in the construction without departing from the principle of the invention or sacrificing any of its advantages.

In Fig. 11 is shown the implement 81 employed for forcibly releasing the upper or cover member 38 of the mold when the latter is to be opened.

The tracks 12 and guard rails 13 are practically continuous, so that the molds may travel in an uninterrupted circuit, so that in event of a mold failing to be shunted or switched to one of the ovens or "run wild", it will merely travel around the continuous tracks back to the starting point where it can be taken care of, and will do no damage.

I claim:

1. An apparatus of the class described comprising an endless carrier including spaced side portions moving in opposite directions, a heating chamber between the sides of the carrier, means for conducting the articles to be treated through said chamber, means for transferring said article from the carrier at one side to the conducting means of the chamber, and means for transferring the article from the conductor means of the chamber to the carrier at the opposite side thereof.

2. In an apparatus of the class described, a carrier device including spaced portions moving in opposite directions, a chamber in which articles are to be treated, means for conducting the articles to be treated through said chamber, means for transferring the article to be treated from the carrier to the chamber conducting means, and means for transferring the article after treatment from the chamber conducting means to the carrier.

3. In an apparatus of the class described, a carrier device including spaced portions moving in opposite directions, a chamber in which articles are to be treated, means for conducting the articles to be treated through said chamber, means for transferring the article to be treated from the portion of the carrier moving in one direction to the chamber conducting means, and means for transferring the article after treatment from the chamber conducting means to the portion of the carrier moving in the opposite direction.

4. In an apparatus of the class described, a carrier device including spaced portions moving in opposite directions, a chamber in which articles are to be treated, means for conducting the articles to be treated through said chamber, means for heating the articles while passing through the chamber, means for transferring the article to be treated from the carrier to the chamber conducting means, and means for transferring the article after treatment from the chamber conducting means to the carrier.

5. In an apparatus of the class described, a carrier device including spaced portions moving in opposite directions, a chamber in which articles are to be treated, means for conducting the articles to be treated through said chamber, means for inducing artificial air currents through said chamber, means for transferring the article to be treated from the carrier to the chamber conducting means, and means for transferring the article after treatment from the chamber conducting means to the carrier.

6. In an apparatus of the class described, a carrier device including spaced portions moving in opposite directions, a chamber in which articles are to be treated, an endless conveyer operating through said chamber, means for transferring the article to be treated from the carrier to the conveyer, and means for transferring the articles after treatment from the conveyer to the carrier.

7. In an apparatus of the class described, a carrier device including spaced portions moving in opposite directions, supporting rails associated with said carrier portions, a chamber in which articles are to be treated, means for conducting the articles to be treated through said chamber, means for transferring the articles to be treated from said rails at one side to the chamber conducting means, and means for transferring the article after treatment from the chamber conducting means to the supporting rails at the opposite side.

8. In an apparatus of the class described, a carrier device including spaced portions moving in opposite directions, means for compressing the article to be treated while in transit over the carrier, a chamber in which articles are to be treated, means for conducting the articles to be treated from the carrier to the chamber conducting means, means for transferring the article after treatment from the chamber conducting means to the carrier, and means for releasing the article from pressure after treatment.

9. In an apparatus of the class described, a carrier device including spaced portions moving in opposite directions, a chamber in which articles are to be treated, means for conducting the articles to be treated through said chamber, a device in the path of the article to be treated while being moved toward the chamber to transfer said article to the chamber conducting means, and a device in the path of the article after treatment to transfer the same to the portion of the carrier moving away from the chamber.

10. In an apparatus of the class described, a carrier device including spaced portions moving in opposite directions, a chamber in which articles are to be treated, means for conducting the articles to be treated through said chamber, a stop device movable into the path of the article to be treated while being moved toward the chamber, and means operative by the moving article to operate said stop device to cause said article to be transferred to the chamber conducting means.

11. In an apparatus of the class described, a horizontal carrier device, an upper horizontal guide track, a lower guide track having an upwardly directed intermediate portion, a carrier device including an endless flexible element and wheels connected thereto and operating on said tracks, and mold suspension devices suspended from said wheels.

12. In an apparatus of the class described, an upper horizontal guide track, a lower guide track having an upwardly directed intermediate portion, a carrier device including an endless flexible element and wheels connected thereto and operating on said tracks, suspension members coupled to swing from said wheel connections, a spring poised support slidable on said suspension member, and flexible elements carried by said support and adapted to be coupled to a mold device to elevate the same when the wheels pass over the upwardly directed portion of the lower guide track.

In testimony whereof, I affix my signature hereto.

CHARLES J. BERTHEL.